April 25, 1967 F. NETTEL ETAL 3,315,372
APPARATUS FOR UNIFORM DISTRIBUTION OF PEBBLES
IN HEAT EXCHANGERS
Filed Nov. 27, 1962
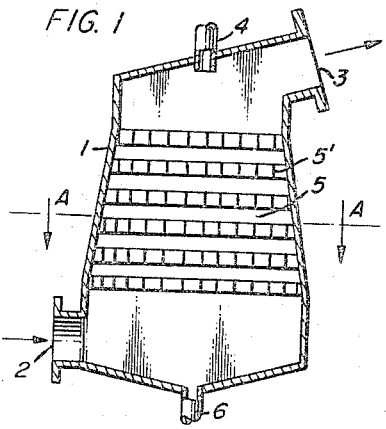
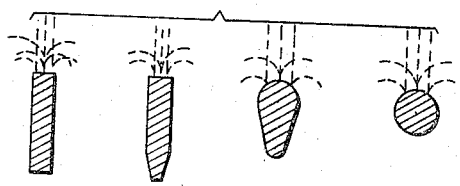
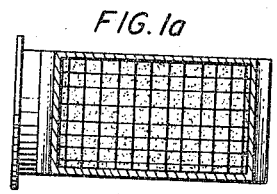
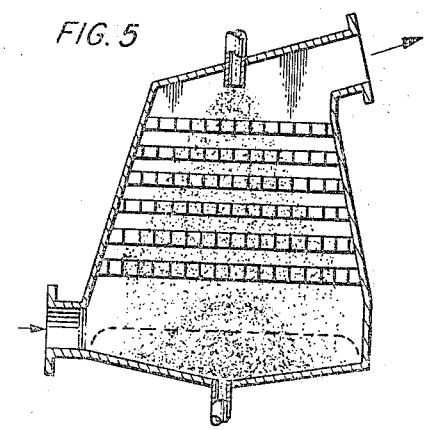
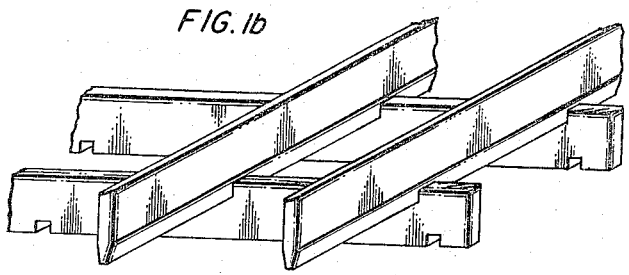
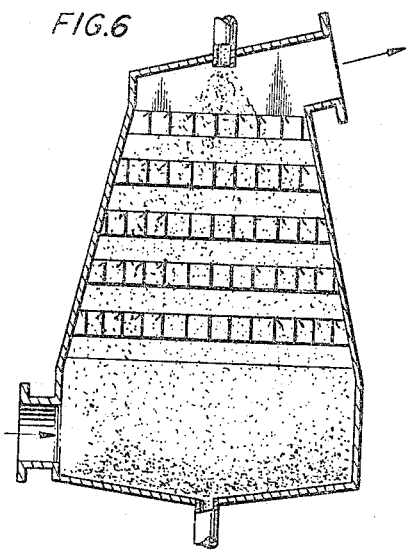
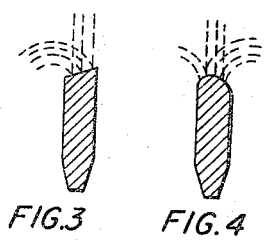
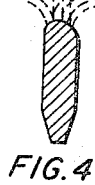
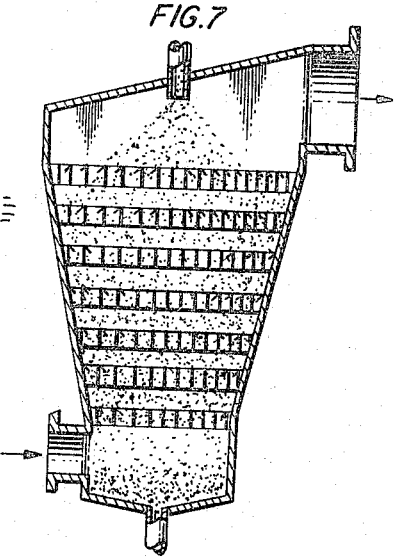
INVENTORS
FREDERICK NETTEL
JOHN KREITNER United States Patent Office 3,315,372
Patented Apr. 25, 1967

3,315,372
APPARATUS FOR UNIFORM DISTRIBUTION OF PEBBLES IN HEAT EXCHANGERS
Frederick Nettel, 173 Chapel Road, Manhasset, N.Y. 11030, and John Kreitner, 52 Brixton Road, Garden City, N.Y. 11530
Filed Nov. 27, 1962, Ser. No. 240,352
4 Claims. (Cl. 34—168)

This invention relates to apparatus to promote uniform distribution of pebbles in contact-type heat exchangers. Heat exchange units of this general type are conveniently used for heating or cooling, treating or converting processes. Known pebble heat exchangers for air, gas, vapor or fluids, utilize a mass of solid pebbles moving downward, at least partly by gravity, as a more or less contiguous mass, mostly through two chambers which are usually but not necessarily disposed in vertical alignment and connected by a restricted throat, sometimes valved, therebetween. Hot gaseous or vapor heating medium from any source is introduced into a lower portion of the upper of the two chambers, flowing upwards through it in countercurrent to the downwardly moving pebbles within said chamber, thereby transferring heat from the said medium to the pebbles. The thus heated pebbles pass through a connecting conduit into the lower chamber where they continue their downward motion. Another gas, vapor or fluid may be introduced into said second chamber, flowing similarly upwards through it, also substantially in countercurrent to the hot pebbles, thereby transfering heat from the pebbles to the air, gas, vapors or fluid which leave said lower chamber heated.

The term "pebbles," as used herein, denotes any solid material of comminuted or granular size and form, of suitable mechanical strength to withstand deterioration by heat shock and breakage and of suitable specific heat capacity. Suitable pebble materials include metals, alloys, carbides, alumina, periclase, beryllia, stellite, zirconia, mullite, ceramics for example, but other materials may be utilized which are either inert, catalyzers or omitting radiation, depending on the process carried on within the apparatus.

Known pebble heat exchangers can be considered to belong to that basic classes as follows:

(a) Such in which the pebbles in the chambers are closely packed over most of the heights of the chambers, flowing as a contiguous mass downwards through them by gravity.

(b) Such in which the pebbles slide down over slanting baffles in layers by gravity, with the medium flowing through the spaces between the baffles and/or through perforations provided in said baffles.

(c) Such in which the pebbles are fluidized, mostly above foraminous screens, by the stream of the treated medium flowing upwards through the pebbles, with the cross sections of the pebbles occupying about the same or more than the free area between the pebbles through which the medium flows.

(d) Such in which the pebbles move in free or obstructed fall through the chambers.

A common and for many applications fatal defect of the classes (a), (b) and (d) lies in the difficulty to realize sustained uniform counterflow contact with the treated fluid. The class (c) disqualifies because of the absence of counterflow due to uncontrolled mixing.

This invention specifically applies to heat exchangers of class (d) in which pebbles descend under the influence of gravity over obstacles in the form of grid rods arranged transversely across the flow of the fluid.

It is the principal object of this invention to provide uniform pebble distribution during the descent of the pebbles while heat is being exchanged, and to attain this by surprisingly simple means.

Other and further objects and advantages will be apparent from the following description and the accompany drawings, which show in diagrammatic form embodiments of the invention by way of non-limiting examples.

FIG. 1 shows a vertical section of a pebble heater chamber in which heat from a stream of hot gases is transferred to a stream of pellets falling in counterflow to the upwardly flowing gases.

FIG. 1a is a horizontal section of the chamber in FIG. 1 along the line A—A.

FIG. 1b depicts a grid in isometric view.

FIG. 2 illustrates four different types of grid rods used in known heat exchangers with pebbles falling down from above and the probable directions and distribution of the pebbles after they have bounced off.

FIG. 3 depicts a grid rod according to the present invention with its upper surface inclined asymmetrically to the vertical, showing also pebbles falling down on the rod and the probable directions and distribution of pebbles after they have bounced off the rod.

FIG. 4 indicates a similar rod as in FIG. 3, with the upper surface of the rod asymmetrically curved.

FIG. 5 shows in more detail the distribution of pebbles in the heat exchanger according to FIG. 1 during their descent and the manner in which the pebbles are distributed below the grid.

FIG. 6 illustrates its vertical section a pebble heater with a grid according to this invention and the manner in which the pebbles are distributed below the grid.

FIG. 7 depicts a pebble cooler chamber.

The obstacles (grids) are preferably designed so that they achieve the greatest number of pebble rebounds, that is, the greatest number of cascade steps, with the least interference with the flow of the medium. It is of particular importance that the obstacles cause as little change in flow velocity as possible; for example, it is advantageous that at the very same level where the flowing medium leaves one layer of obstacles, a second layer of similar obstacles shall begin, thereby avoiding any sudden enlargement of the flow area. This is best achieved for example by a grid-like arrangement of obstacles as shown in FIG. 1 which shows a pebble heater in which 1 is the chamber 2 the inlet opening, 3 the outlet opening for the fluid processed, for example hot gases. 4 is the inlet pipe for the pebbles, (several such inlets may be provided). 5 is the grid system consisting of rods 5' of metal or ceramic, extending transversely in layers over most of the height of the chamber. The fluid flows in an upward path from 2 to 3 through the chamber. The pebbles enter through pipe 4 and fall on the grid, hitting the upper edges of the rods and begin their descent by bouncing in succession against the upper edges of all subjacent layers of rods, to finally leave the shell through the pipe 6.

One of the most important prerequisites for efficient heat transfer is uniform pebble distribution over the entire cross sectional area of flow. Many mechanical devices have been proposed involving in many cases movable feeders such as conveyors, screws, blowers, screens, etc. none of which has satisfactorily solved the problem of uniform feeding of pebbles to the grid. Besides, they are subject to mechanical failure and first costs are high. But even if such uniform distribution across the top layer of the grid could be realized by such means, this would solve only a small part of the problem because in many practical cases the cross sectional area change drastically over the height of the chamber (due to changes in temperature and consequently specific volume of the flowing gas or vapors), and uniform distribution across the top layer does not in itself safeguard maintenance of such distribution across the lower layers. In many practical cases it is desired to avoid substantial changes in gas velocity which results in pebble heaters being wider at the bottom and narrower at the top (see FIGS. 1, 5 and 6) while pebble coolers are wider at the top and narrower at the bottom (see FIG. 7).

The theory of distribution of falling comminuted material (steel shot) goes back to the mathematician Gauss who arranged uniformly distributed nails on an inclined board. Steel shot was fed onto the board through an inlet above the nail pattern so that the shot had to bounce repeatedly against nails before reaching the bottom edge of the board, along which a row of pockets of equal width was provided to catch the shot. It became immediately obvious that much more shot collected in the pockets below the inlet than in those further to the right and left. This typical distribution (the "Gauss distribution curve" is indicated in FIG. 5 by the shape of the pebble accumulation at the bottom of the chamber. It was further proved that the pattern of pebble distribution is largely independent of the number of nails and the distance between them as long as they are uniformly distributed in similar patterns.

Known heat exchanges use grid rods of rectangular, round or oval cross section, all characterized by having an axis of symmetry parallel with the direction of flow of the fluid (see FIG. 2).

As long as the upper surface of a grid rod is plane and at right angle to the flow of the fluid, the odds of a pebble falling on it to bounce off to the right or left of the rod are obviously 50:50, which also means that the particular rod cannot change the character of the pebble distribution. The same applies to other shapes of grid rod as long as their upper surfaces exposed to falling pebbles are shaped symmetrical to the vertical (see FIG. 2).

The principal object of this invention is achieved by deviating at least in some grid rods from this symmetry condition. In particular it provides for upper rod surfaces either plane but not horizontal, or gable shaped which are unsymmetrical to the vertical, or curved rod surfaces with the curve asymmetrical to the said vertical. (see FIG. 3 and FIG. 4).

FIG. 1 illustrates the transverse arrangement of the rods spaced horizontally from each other. Twelve layers are shown, extending over most of the height of the chamber. The rods in successive layers are offset horizontally as shown by dotted lines in FIG. 1a. The number of layers depends on the required retention time for the pebbles.

FIG. 5 and 6 show pebble heaters in which the flow area of the fluid is larger at the bottom of the chamber 1 than at the top. Even if known mechanical means had succeeded in providing a uniform pebble distribution across the top layer of the grid, it is obvious that with grid rods of known design (FIG. 2) the part of the flow areas near the walls would in the following layers receive fewer pebbles than the central portions, with a consequent deterioration of heat transfer efficiency. This condition is still worse in pebble coolers (FIG. 7) in which the cross sectional area becomes smaller in the direction of pebble descent. In this case uniform distribution across the top layer would, with symmetrical grid rods as per FIG. 2, soon result in a serious over-concentration of pebbles along the walls, increasing fast with each successive layer.

Obviously, such a distribution of pebbles in a heat exchanger is very undesirable for efficiency reasons. What is desired is a pebble distribution in which each percent of the pebbles flow meets one percent of the fluid flow. The fluid flow in turn is desired to be uniform across each flow section, thus minimizing pressure losses. Hence it is desired to obtain a pebble flow which is also uniform across each flow section, ending up with a distribution as indicated by the dotted line in FIG. 5.

Uniform pebble distribution in all sections, even when the sectional areas increase or decrease in the direction of pebble descent, requires a transverse "migration" of pebbles. In grids made of symmetrical rods, each of which presents a 50:50 chance of right or left rebound, can occur at points where the distribution is non-uniform; there, the pebbles travel during successive rebounds from points of greater flow density to points of smaller flow density. Thus known grids require the existence of an undesirable condition (non-uniformity) before it can begin to correct itself.

The present invention avoids these drawbacks by changing the basic premise of the 50:50 chance of right or left rebound on an individual rod. By "biasing" rods as shown in FIG. 3 or 4 a transverse migration of pebbles is obtained even while maintaining substantially uniform distribution. According to this invention this fact is utilized for enforcing a radical outward or inward migration in cases of increasing or decreasing cross-sectional areas (FIGS. 1 and 7, respectively).

Moreover, and most importantly, intense radial migration caused by biasing provides an extremely simple means for distributing a pebble stream issuing more or less concentrated from pebble feeder means, thereby attaining uniform distribution after comparatively few rebounds on the top layers of the grid. This replaces mechanical distributor means with moving parts. The same basic method of fast distribution by biased grids may be used also where the pebbles are fed through a plurality of inlets.

According to the principles outlined above, FIG. 6 shows several top layers of the grid with rods strongly biased for obtaining uniform distribution of the pebble stream while the lower layers show a weak outward bias-stream to provide such radial migration as the widening of the shell requires. Conversely, FIG. 7 shows strong outward biasing in the top layers for fast initial distribution, followed by weak inward biasing to obtain such inward migration as the narrowing of the shell requires.

It is immaterial for the purposes of this invention what particular materials are used for the grids and what materials are used for the pebbles.

Having now described and illustrated this invention, it is to be understood that this invention is not limited to the specific forms and arrangements of parts herein described and shown, or specifically covered by the claims.

What we claim is:

1. In a contact-type heat transfer apparatus using a stream of pebbles as heat carriers, which apparatus comprises upright chamber means in which heat is being transferred between a descending stream of pebbles and an upwardly flowing stream of elastic fluid, said pebble stream being at the place of its entry non-uniformly distributed across the fluid flow area, a system of spaced horizontal grid rods fixedly disposed in said chamber means in a plurality of horizontal layers in each of which the grid rods are parallel to each other, the layers being disposed at successively lower levels, over which rods the pebbles cascade downwards under the influence of gravity in free fall from one layer to the subjacent layer, while heat is being exchanged between said pebbles and said counterflowing elastic fluid, that improvement constituting the provision, in each of a plurality of said layers, of a predetermined number of grid rods having upper surfaces which are laterally asymmetrical, i.e., asymmetrical relative to the vertical plane through the centerline of such rod, for laterally deflecting pebbles impinging thereon in greater number to one side of such asymmetrical rods than to the opposite side, so as to move by said deflection falling pebbles away from the point of entry toward the walls of said chamber means, thereby attaining improved uniformity of pebble distribution across subjacent rod layers.

2. A contact-type heat transfer apparatus as set forth in claim 1, having alternative layers of grid rods arranged at right angles to their upper and lower adjacent layers for achieving deflections of pebbles in adjacent layers in orthogonal directions to each other, for achieving improved uniformity of pebble distribution across the sectional area of said chamber means.

3. A contact-type heat transfer apparatus as set forth in claim 2, wherein the upright chamber means widens downwardly, having in a predetermined number of layers below the point of pellet entry predetermined numbers of asymmetrical rods disposed to deflect pebbles laterally towards the wall of the chamber in orthogonal directions to each other to achieve substantial uniformity of pebble distribution across the sectional area of the chamber means, and having in the following lower layers predetermined numbers of asymmetrical rods to further deflect pebbles laterally towards the walls of said chamber, to maintain substantially uniform pebble distribution in the downwardly widening part of the chamber means.

4. A contact-type heat transfer apparatus as set forth in claim 2 wherein the upright chamber means narrows downwardly, having in a predetermined number of layers below the point of pellet entry predetermined numbers of asymmetrical rods disposed to deflect pebbles laterally toward the walls of the chamber in orthogonal directions to each other, to achieve substantial uniformity across the sectional area of the chamber means, and having predetermined numbers of asymmetrical rods in the following lower rod layers, disposed to deflect pebbles laterally in orthogonal directions to each other from the regions near the walls of said chamber towards its center to maintain substantially uniform pebble distribution in the downwardly narrowing part of the chamber means.

References Cited by the Examiner

UNITED STATES PATENTS

| | | | |
|---|---|---|---|
| 24,155 | 5/1859 | Snell et al. | 209—393 |
| 783,903 | 2/1905 | Skoog | 263—30 |
| 1,009,422 | 11/1911 | Larsen | 34—171 |
| 2,737,295 | 3/1956 | Symons | 209—254 |
| 3,046,674 | 7/1962 | Wesche | 34—171 |
| 3,104,955 | 9/1963 | Marchand | 34—168 |

FOREIGN PATENTS 933,898 9/1909 France.

OTHER REFERENCES

Link-Belt Company, Composite Catalogue of Oil and Pipeline Equipment, 1934, 5th ed., p. 270.

FREDERICK L. MATTESON, JR., *Primary Examiner.*

NORMAN YUDKOFF, WILLIAM F. O'DEA,

*Examiners.*

J. SOFER, C. R. REMKE, *Assistant Examiners.*